US012254787B2

(12) United States Patent
Sagidullin

(10) Patent No.: US 12,254,787 B2
(45) Date of Patent: Mar. 18, 2025

(54) REFLECTIVE DECORATIVE PANEL

(71) Applicant: Denis Sagidullin, Krasnodar (RU)

(72) Inventor: Denis Sagidullin, Krasnodar (RU)

( * ) Notice: Subject to any disclaimer, the term of this patent is extended or adjusted under 35 U.S.C. 154(b) by 140 days.

(21) Appl. No.: 18/129,998

(22) Filed: Apr. 3, 2023

(65) Prior Publication Data

US 2023/0343252 A1 Oct. 26, 2023

(51) Int. Cl.
*G09F 13/16* (2006.01)
*B44F 1/02* (2006.01)
*G09F 7/06* (2006.01)

(52) U.S. Cl.
CPC ................ *G09F 13/16* (2013.01); *B44F 1/02* (2013.01); *G09F 7/06* (2013.01)

(58) Field of Classification Search
CPC ... G09F 13/16; G09F 7/06; B44F 1/02; A47G 1/065
See application file for complete search history.

(56) References Cited

U.S. PATENT DOCUMENTS 2,938,291 A * 5/1960 Tavan ..................... G09F 13/16 428/66.5
2,969,606 A * 1/1961 Battaglia ................. G09F 13/16 428/66.5
3,026,608 A * 3/1962 Holcombe .............. G09F 13/16 29/513
3,043,039 A * 7/1962 Battaglia ................. G09F 13/16 40/613
3,166,863 A * 1/1965 Gray ........................ G09F 13/16 24/700
3,189,183 A * 6/1965 Thrasher ................. G09F 13/16 211/13.1
3,202,288 A * 8/1965 Thrasher ................. G09F 13/16 211/13.1
3,260,372 A * 7/1966 Jauslin .................... G09F 13/16 211/13.1
4,017,992 A * 4/1977 Kajitani .................. G09F 13/16 40/439
10,559,234 B1 * 2/2020 Younse ...................... G09F 7/06
2010/0068424 A1 * 3/2010 Li ............................. B44F 1/02 428/30
2011/0287207 A1 * 11/2011 Shwed .................. G09F 13/165 428/53

(Continued)

*Primary Examiner* — Gary C Hoge
(74) *Attorney, Agent, or Firm* — Nadya Reingand

(57) ABSTRACT

A reflective decorative panel is provided, which comprises a monolithic base that is a module of the panel and cantilever elements made integral with the base. Movable reflective elements are arranged on the cantilever elements by using holes. Connecting elements for connecting the modules of different reflective decorative panels are provided on edge sections of the base. Each connecting element is made stepwise: with a first protrusion and a second protrusion on one side, and with a protruding element extending from the first protrusion on another side such that there is a groove under the protruding element. The connecting elements are configured to rigidly connect the panels due to the entry of the protrusions and grooves of one panel into the reciprocal grooves and protrusions of another panel. The reflective decorative panel simplifies the process of assembling connectable panel modules and increases the reliability of their connections.

3 Claims, 12 Drawing Sheets

(56) References Cited

U.S. PATENT DOCUMENTS

| | | | | |
|---|---|---|---|---|
| 2015/0003905 | A1* | 1/2015 | Cowan | F16B 5/0056<br>403/361 |
| 2015/0199925 | A1* | 7/2015 | Pulos | G09F 7/20<br>40/594 |
| 2018/0374404 | A1* | 12/2018 | Ainge | G09F 19/16 |
| 2021/0335150 | A1* | 10/2021 | Sagidullin | G09F 13/165 |
| 2022/0084446 | A1* | 3/2022 | Sagidullin | G09F 13/16 |
| 2024/0156282 | A1* | 5/2024 | Walsh | A47G 1/205 |

* cited by examiner

View A

B-B

View B

View D

View D

REFLECTIVE DECORATIVE PANEL

FIELD OF THE INVENTION

The invention relates to the field of presentation of design, advertisement and construction, and in particular to devices for displaying images by reflecting light radiation used in the manufacture of a wide range of design works, advertising signs, billboards, panels, etc.

BACKGROUND OF THE INVENTION

Currently, reflective decorative panels are very popular in the design of the streets of cities and towns.

In the conditions of serial production of such panels in a short time, for example, when decorating a city for holidays and large-scale events, the task of minimizing the time required to manufacture a reflective decorative panel and simplifying its assembly becomes relevant.

When assembling a panel consisting of modules into a single panel picture, a cumbersome operation consists in attaching the modules to each other.

RU 152342 (20 May 2015) discloses a reflective decorative panel comprising a base, means for attaching reflective elements configured as rods of variable longitudinal section, on which movable reflective elements. The base is configured as a lattice frame support made of plastic, which consists of a frame and longitudinal and transverse bearing strips. The means for attaching the reflective elements are arranged on the longitudinal strips of the frame support at attachment points. If it is necessary to significantly increase the area of the panel, the frame supports are interconnected by connecting elements in the overlapping manner.

The disadvantages of the panel known from this document are the complexity of its assembly, as well as the insufficient strength of its connection, since the overlap connection needs additional fixation to avoid opening the panels when the group of the panels is bent.

RU 182951 (6 Sep. 2018) discloses a reflective decorative panel comprising a base which is a panel module connectable with other modules. The base is configured as a lattice frame support made of plastic, which consists of a frame and longitudinal and transverse bearing strips. The frame support comprises cantilever elements with movable reflective elements cantilevered thereon. The cantilever elements are made integral with the frame support and consist of a rod, a cap and a body. The bodies of the cantilever elements arranged on the frame support along the perimeter of the frame support comprise seating elements provided on the reverse side of the frame support. The reflective decorative panel comprises connecting elements on the sides of the frame support for connection with other frame supports. On the frame of the frame support, there are connecting elements made integral with the panel itself for connection with other frame supports. The connecting elements are configured as a solid strip having a free end provided with a seating element connected with the seating element of the body of another frame support. The seating element of the body is a receiving element configured as a groove on the reverse side of the frame support in the frame with entry into the body of the cantilever element, while the seating element of the connecting element is configured as a spike at the free end of the connecting element.

An embodiment is possible, in which the seating element of the body is a locking element configured as a spike on the reverse side of the frame support in the frame inside the body, while the seating element of the connecting element is configured as a hole at the free end of the connecting element.

The disadvantages of this type of connectors disclosed in this document are as follows: since the cantilever element is connected to the body, the locking element does not have sufficient fixation; when a panel picture consisting of the panels is bent, the connectors jump out of the receiving element and fall apart. Furthermore, the connectors are arranged on the inside of the panel, which greatly complicates the assembly and disassembly of products. It is required to resort to appropriate tools for their disassembly.

RU 2718657 (13 Apr. 2020) discloses a reflective decorative panel comprising a base which is a panel module comprising retaining elements and reflective elements cantilevered on the retaining elements by means of holes. The retaining elements are made integral with the base by using a polymer casting method. The base is configured as a lattice frame support made of plastic, which has longitudinal and transverse bearing strips. Alternatively, the base is configured as a one-piece, monolithic base made of plastic. On the edge sections of the base, the retaining elements are provided with connecting grooves for connecting the modules. On the reverse side of the base at the locations of rods for movable reflective elements, there are connecting elements configured as planks made integral with the base. A spike is provided at the end of the connecting element.

The modules are interconnected according to the mortise and tenon joint principle. The spike of the connecting element is installed into the cavity with an interference fit through the connecting groove in the retaining element. To connect the modules, separate connecting planks can be used, which are provided with spikes at both ends of the planks. The technical result consists in creating a decorative panel with a base design that reduces the panel weight and simplifies the panel assembly process. This type of connectors disclosed in this document suffers from insufficient fixation: when a panel picture consisting of the panels is bent, the connectors jump out of the receiving elements and fall apart. Furthermore, the connectors are arranged on the inside of the panel, which greatly complicates the assembly and disassembly of products. It is required to resort to accompanying tools for their disassembly.

Thus, the known technical solutions have technologically sophisticated attachment elements. Such attachment elements, usually arranged at two points on the side of the panel, must ensure a tight connection therebetween. The density of the connection leads to additional efforts during the assembly and disassembly of the panels, i.e., complicates the process of assembling and disassembling the reflective decorative panels that make up a decorative panel picture.

SUMMARY OF THE INVENTION

The technical result consists in creating a reflective decorative panel that simplifies the process of assembling connectable modules and increases the reliability of their connections.

A reflective decorative panel is provided, which comprises a monolithic base that is a module of the panel and cantilever elements made integral with the base. Movable reflective elements are arranged on the cantilever elements by using holes. Connecting elements for connecting the modules are provided on edge sections of the base. The panel is characterized in that each connecting element is made stepwise: with a first protrusion and a second protrusion on one side, and with a protruding element extending from the first protrusion on another side such that there is a groove under the protruding element. The connecting elements are configured to rigidly connect the panels due to the entry of the protrusions and grooves of one panel into the reciprocal grooves and protrusions of another panel.

The panel has a frame configured as profile planks which are provided with the connecting elements to rigidly connect the frame with the panel due to the entry of protrusions and grooves of the frame into the reciprocal grooves and protrusions of the panel.

The connecting elements of the panel are made with high precision.

The cantilever elements comprise a body, a holder, and a fixing head. The body has shoulders configured to limit the movement of the movable reflective elements horizontally. The body has a cavity accommodating the holder configured as a semi-cylinder which has a complex profile and is connected by a flat side to the body; in this case, the holder passes into the fixing head with a single flat surface of the holder and the upper part of the head, and the lower part of the fixing head has a larger diameter than the holder and forms a protruding section above the holder. The fixing head tapers towards a free end in the form of a truncated cone.

BRIEF DESCRIPTION OF THE DRAWINGS

The essence of the invention is explained by the drawings. The drawings are not restrictive, and they are provided only for a better understanding of the essence of the invention. In the drawings.

LIST OF REFERENCE SIGNS

1—panel-base;
2—cantilever element;
3—movable reflective elements;
4—body of the cantilever element;
5—holder;
6—fixing head;
7—shoulders of the holder body;
8—cavity of the holder body;
9—flat side of the holder;
10—protruding section;
11—hole in the movable reflective element 3;
12—panel stiffeners;
13—connecting elements;
14—first protrusion;
15—second protrusion;
16—protruding element;
17—groove;
18—frame;
19—connecting elements of the frame.

DETAILED DESCRIPTION OF THE INVENTION

Figure 2:
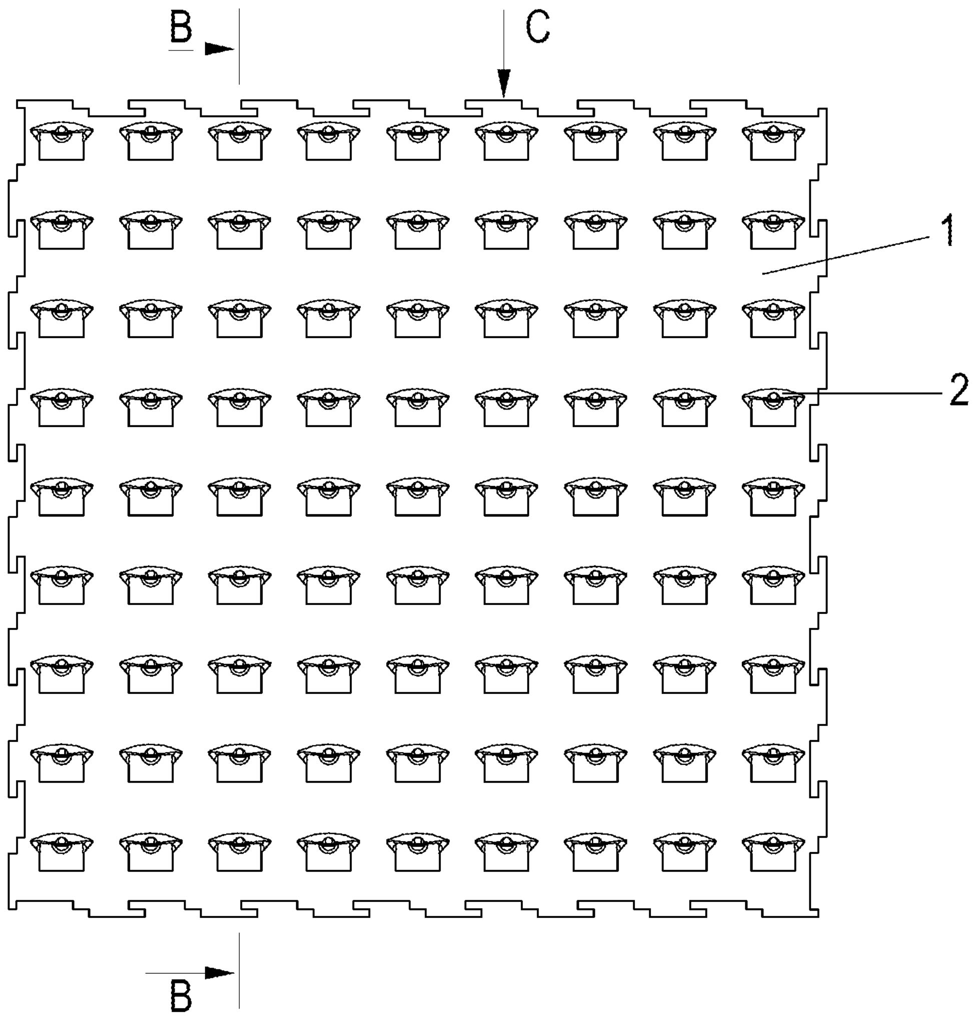
FIG. 2 shows a front view of the panel of FIG. 1.
Figure 3:
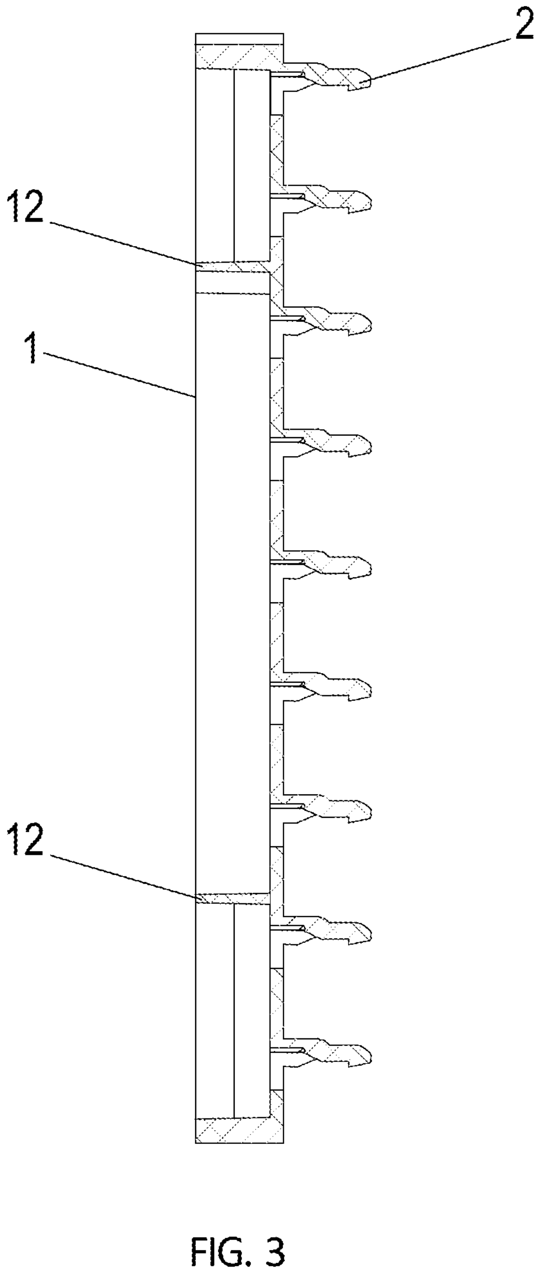
FIG. 3 shows a sectional side view of the panel of FIG. 1.
Figure 4:
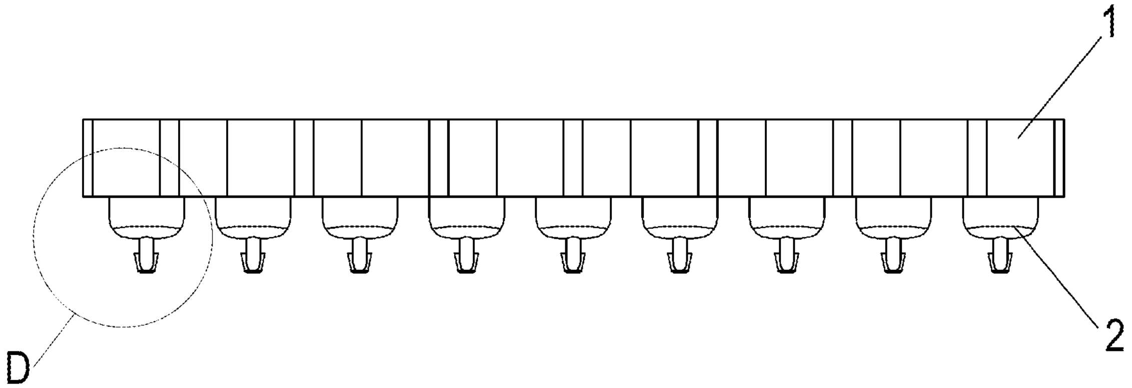
FIG. 4 shows view B from FIG. 2, which is a top view of the panel of FIG. 1.
Figure 5:
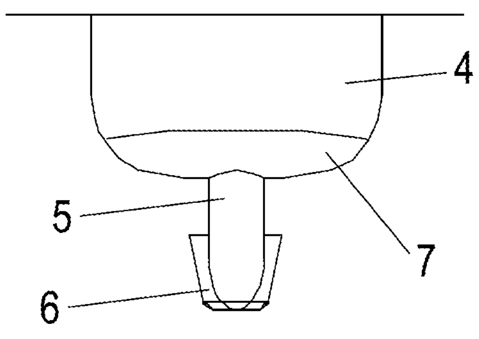
FIG. 5 shows view D from FIG. 4, which is a top view of a cantilever element.
Figure 6:
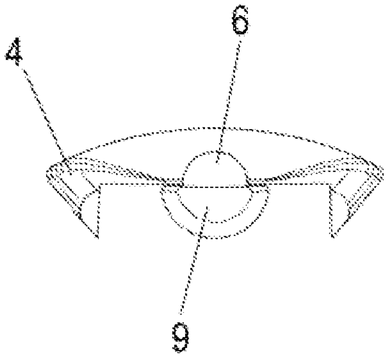
FIG. 6 shows a frontal view of the cantilever element.

A reflective decorative panel-module 1 comprises a base having a plurality of cantilever elements 2 of variable longitudinal section (see FIGS. 1, 2), at the free end of each of which there are movable reflective elements 3 (see FIG. 3).

The panel 1 is made of a polymeric material and is integral with the cantilever elements 2. On the rear side of the panel, stiffeners 12 are made in the form of strips to give the panel additional rigidity (see FIGS. 3, 10).

The panel can be made of colored or transparent polymeric materials, such as ABS, Polypropylene, Polycarbonate, SAN-plastik, etc.

Figure 1:
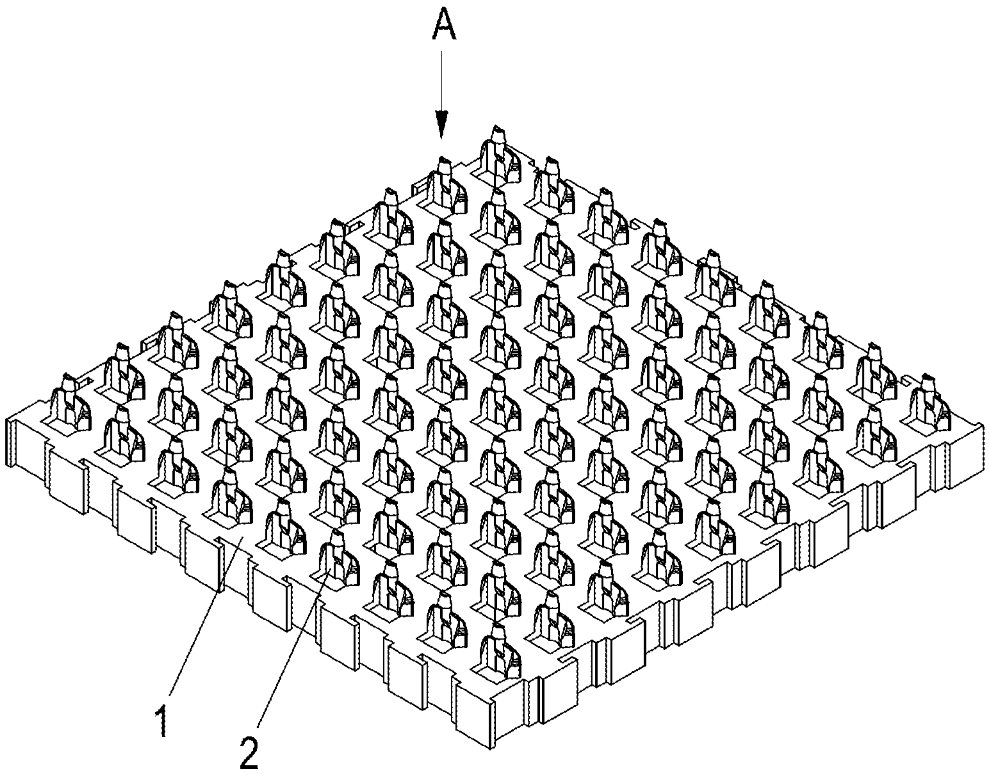
FIG. 1 shows a general view of a panel.
Figure 10:
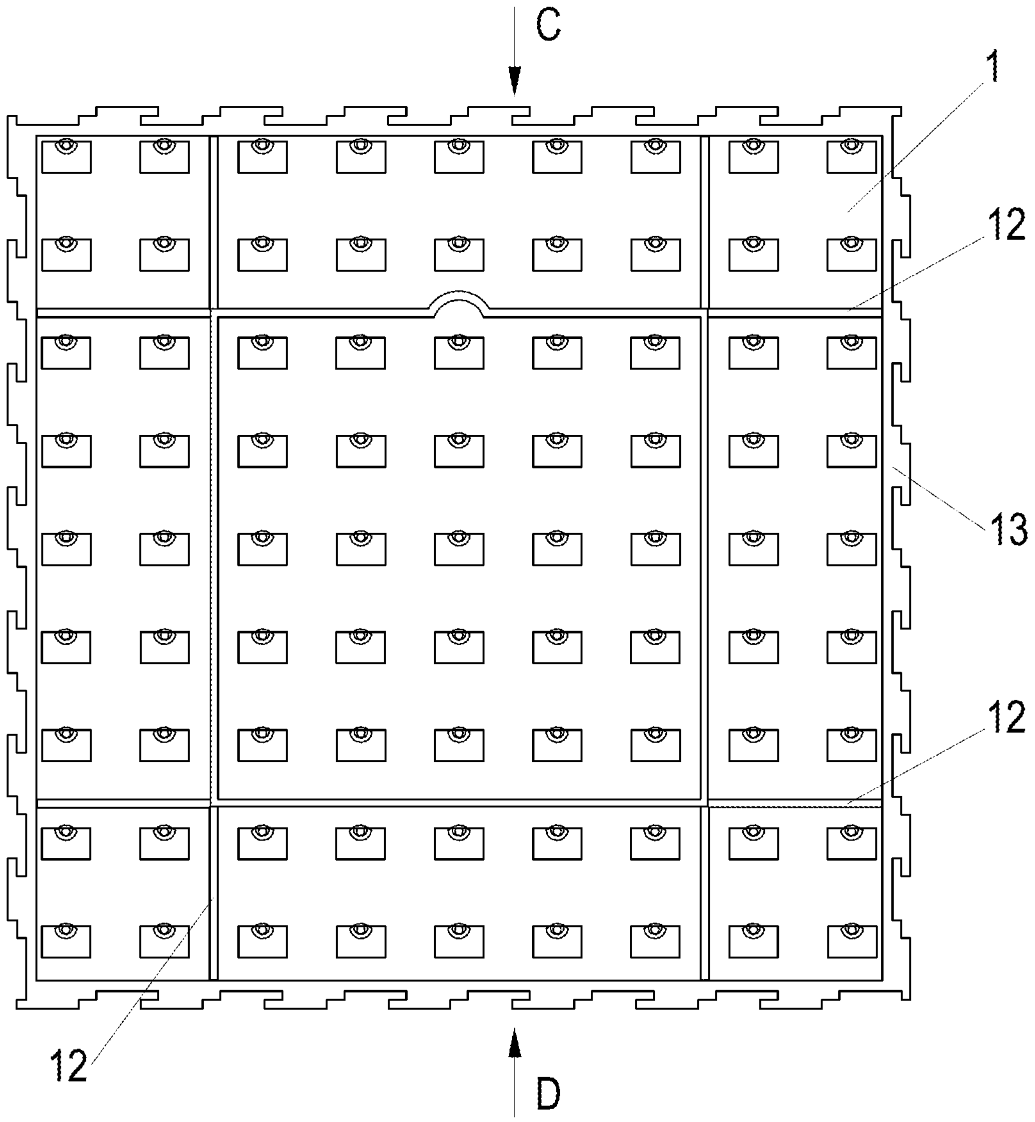
FIG. 10 shows a rear view of the panel of FIG. 1.
Figure 11:
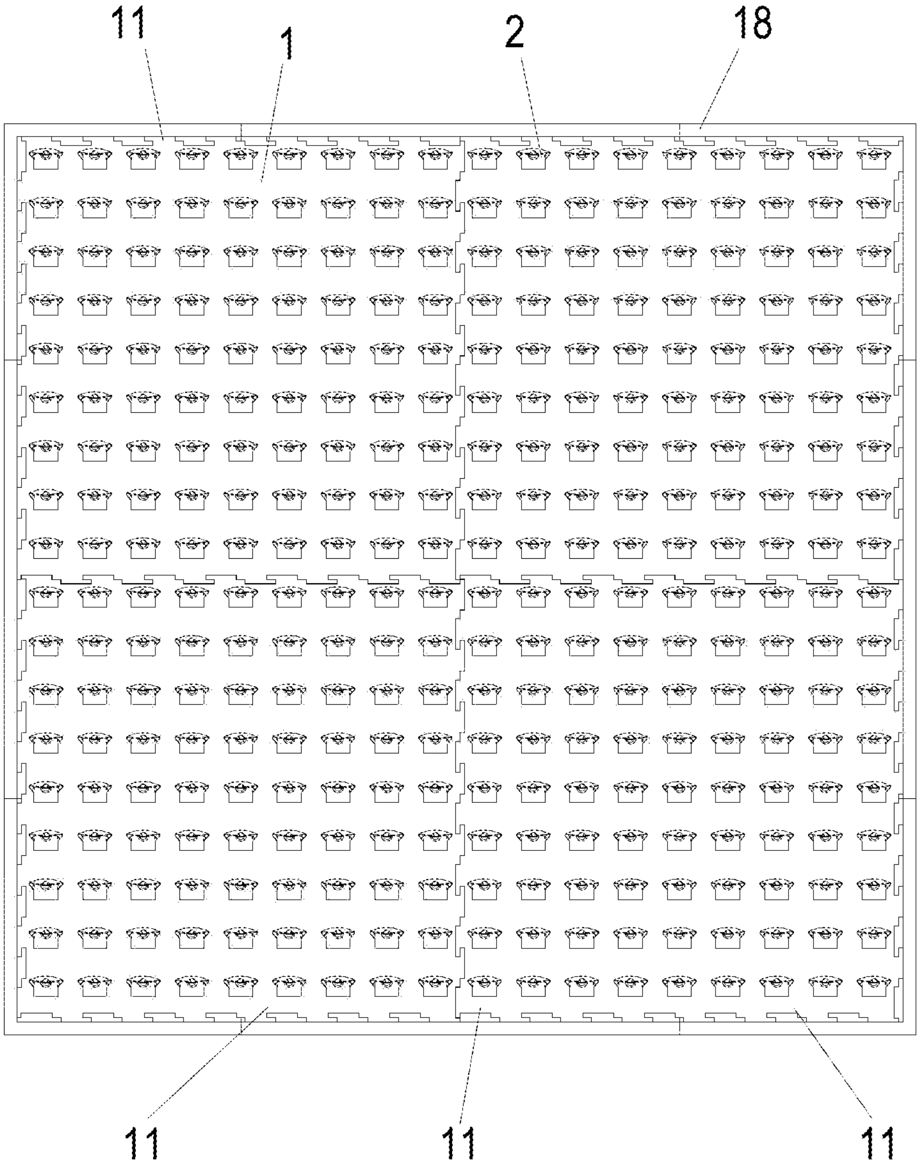
FIG. 11 shows a frontal view of an assembled panel picture.

The panel 1 is configured to be connected to other panels that constitutes a panel picture as a whole (see FIG. 11), and is provided with connecting elements 13 at the edges of the four sides of the panel (see FIGS. 1, 10).

Figure 12:
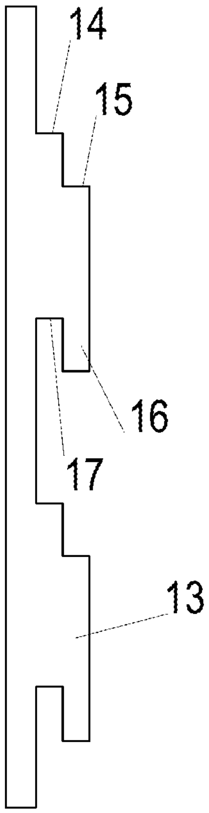
FIG. 12 shows connecting elements of the panel.

The connecting elements 13 (see FIGS. 2, 10) are made stepwise: with a first protrusion 14 and a second protrusion 15 on one side, and with a protruding element 16 extending from the first protrusion 14 on another side such that there is a groove 17 under the protruding element 16 (see FIG. 12).

The connecting elements 13 are configured to mate with the reciprocal connecting elements of another panel.

Figure 13:
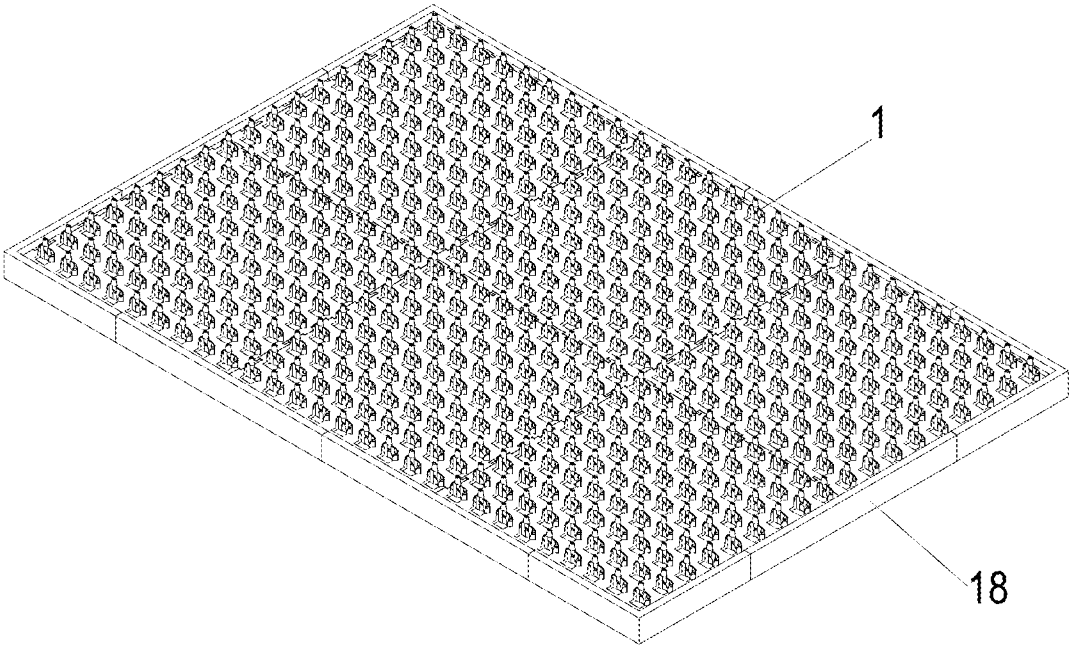
FIG. 13 shows the assembled panel picture with a frame.
Figure 15:
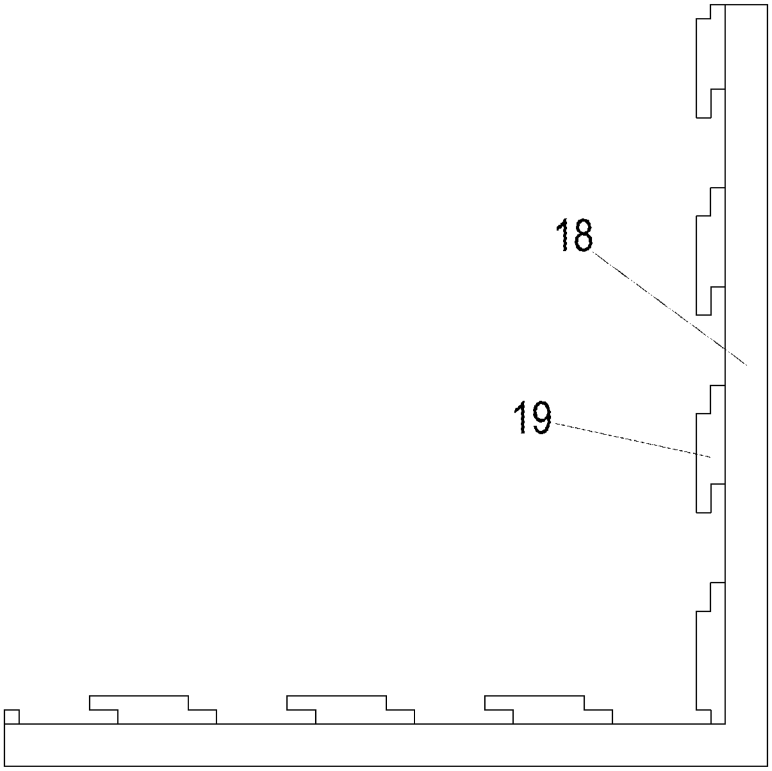
FIG. 15 shows a corner frame.
Figure 16:
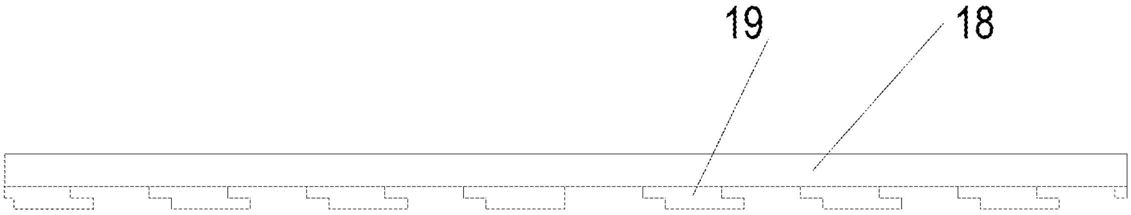
FIG. 16 shows a linear frame.

The panel can be made with a frame 18 in the form of profile planks, a corner frame (see FIG. 15), or a linear frame (see FIG. 16). The frame enhances the rigidity of the final product and gives the panel picture a finished look (see FIGS. 11, 13).

Figure 17:
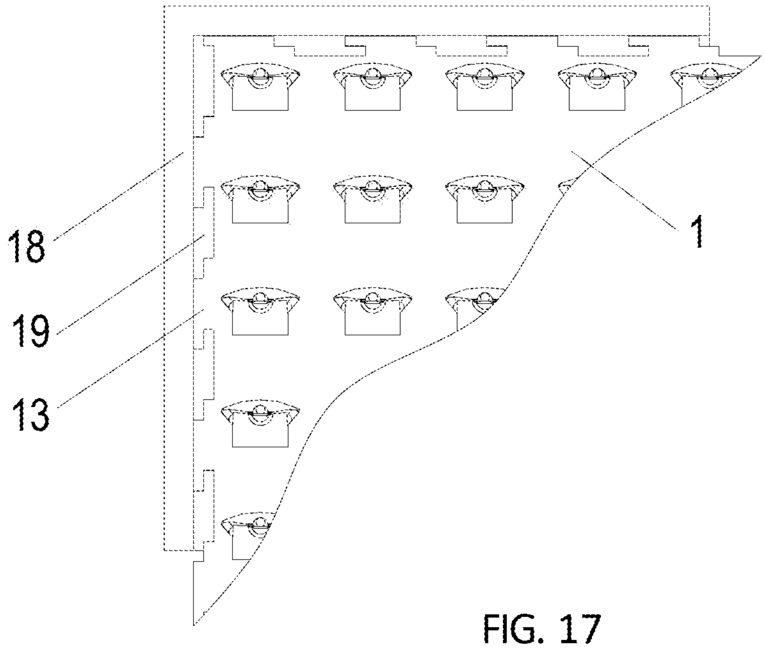
FIG. 17 shows a fragment of the connection of the panel with the corner frame.
Figure 18:
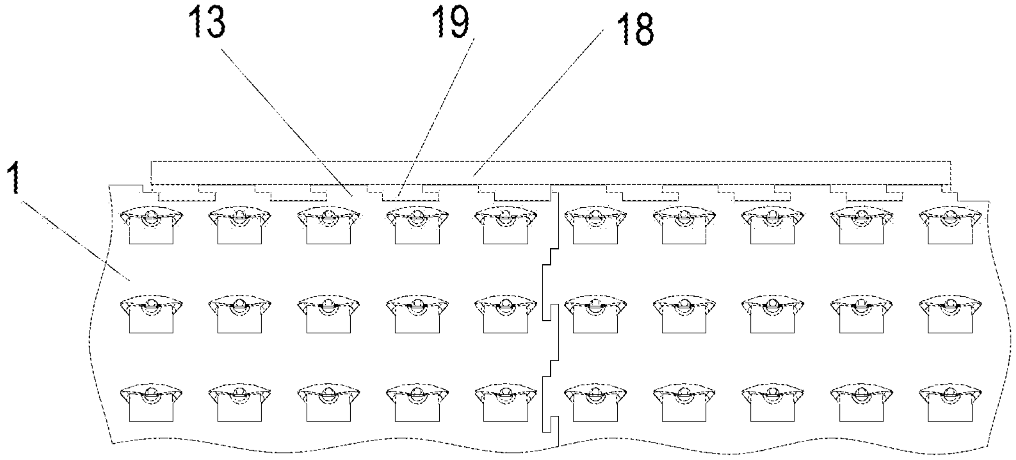
FIG. 18 shows a fragment of the connection of the panel with the linear frame.

The frame 18 has connecting elements 19 configured to connect with the connecting elements 13 of the panel. FIG. 16 shows a fragment of the connection of the panel with the corner frame. FIG. 17 shows a fragment of the connection of the panel with a linear frame. The panel can be connected, at its corners, with one to four corner frames. The panel can be connected, on each side, with as many linear frames as necessary to completely fill the side with the linear frames.

The multiplicity of the linear frames can be: one panel—one linear frame.

The cantilever element 2 (see FIGS. 5, 6, 7, 8) comprises a body 4, a holder 5, and a fixing head 6.

The body 4 has shoulders 7 which are configured to limit the movement of the movable reflective element along the cantilever element in one direction—horizontally. The body 4 has a cavity 8, in which the holder 5 is arranged (see FIG. 8).

The holder 5 is essentially made in the form of a half-cylinder having a complex profile and is connected with a flat side 9 to the body 4. (A half-cylinder is a geometric three-dimensional body formed by dissecting a circular cylinder by a plane in which its axis of symmetry lies (Wiktionary)) (see FIGS. 6, 7). The holder 5 passes into the fixing head 6 with the single flat surface 9 of the holder and the upper part of the head.

Figure 7:
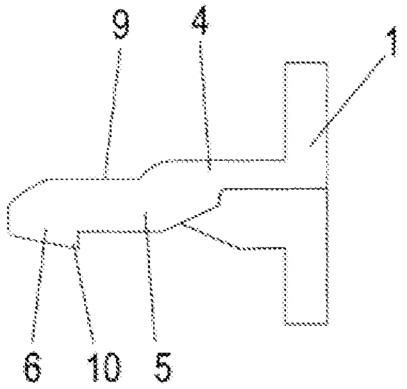
FIG. 7 shows a side view of the cantilever element.

The lower part of the head has a larger diameter than the holder and forms a protruding section 10 above the holder 5 (see FIG. 7).

Figure 8:
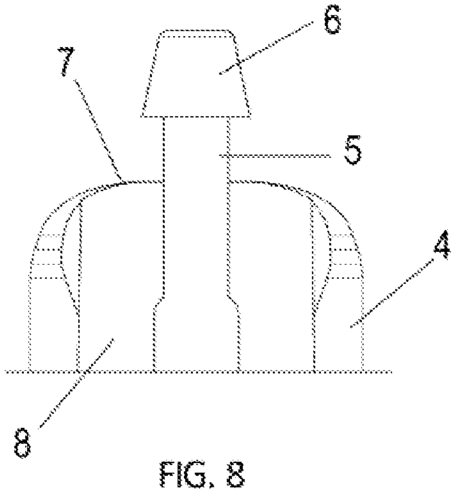
FIG. 8 shows a bottom view of the cantilever element.

The fixing head 6 tapers towards its free end in the form of a truncated cone (see FIG. 8).

Figure 9:
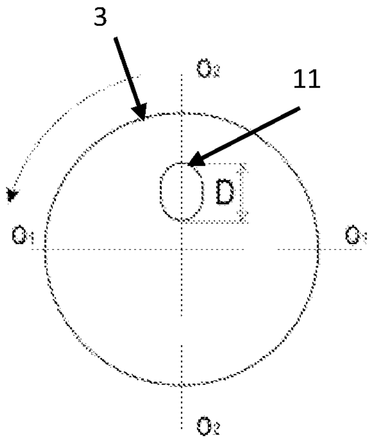
FIG. 9 shows a movable reflective element.
Figure 9A:
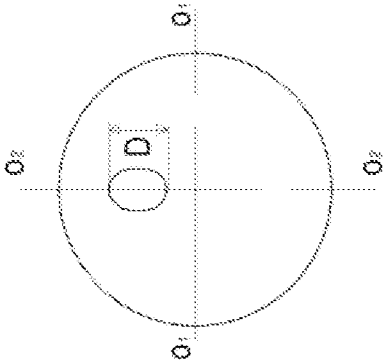
FIG. 9A shows the rotated movable reflective element.

The movable reflective element 3 (see FIG. 9) has an oval hole 11, the largest size D of which corresponds to the largest diameter of the fixing head 6. It is possible to make the hole 11 rectangular (not shown). The hole 11 of the movable reflective element is made in a vertical arrangement. This makes it possible to freely put on the head, and then on the holder 5 of the movable reflective element 3 through the hole 11 according to its largest size D (see FIG. 9), followed by turning the movable reflective element 90 degrees relative to the fixing head (see FIG. 9A). As a result, the head 6 covers, with its protrusion 10, the hole 11 and prevents the movable reflective element 3 from slipping off the cantilever element 2.

Operation

By injection molding, the panel-base 1 is produced in the amount necessary to make up a whole panel picture, with the solid cantilever elements 2 and the connecting elements 13 along the edges of each panel. The connecting elements are made with a high degree of accuracy, which allows one to rigidly connect the panels to each other without significant effort. To ensure these conditions, the accuracy of the execution of the connecting elements is within 2.0 microns.

The ready-made panels eliminate the time required for the manufacture of individual parts, as well as do not require special training to create complex decorative panel pictures.

Figure 14:
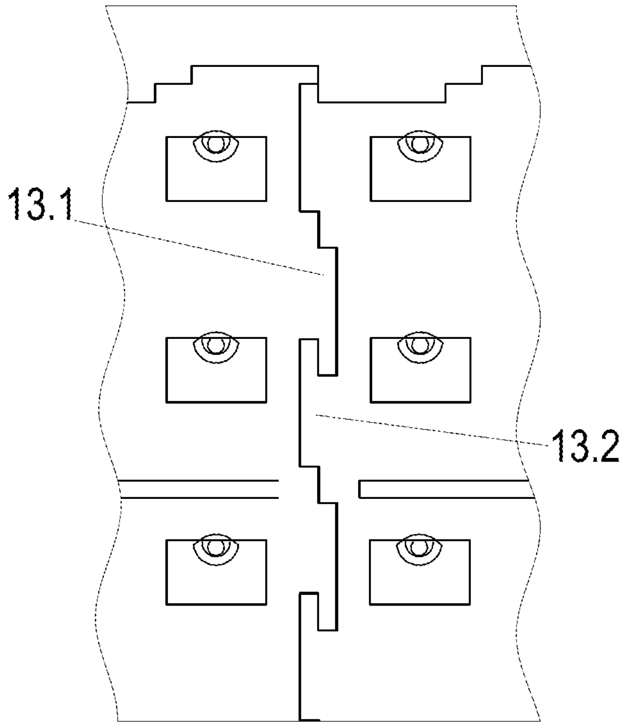
FIG. 14 shows a fragment of an inter-panel connection section.

The connection of the individual panels in the panel picture is carried out with one click, by closing the connecting elements 13 of the panels. Said closing is carried out by placing the connecting elements 13 of one panel 1.1 over the counterpart of the connecting elements of another panel 1.2 and pressing one panel against another. At the same time, due to the high accuracy of manufacturing the connecting elements, some elements enter the corresponding counterparts: the protruding element 16.1 of the connector 13.1 of the first connected panel enters the reciprocal groove 11.2 of the connector 13.2 of the second connected panel, while the first protrusion 14.1 of the connector 13.1 of the first connected panel is closed with the second protrusion 15.2 of the connector 13.2 of the second connected panel, and the second protrusion 15.1 of the connector 13.1 of the first connected panel is closed with the first protrusion 14.2 of the connector 13.2 of the second connected panel (see FIG. 14), and are held in them. The protruding element 16 prevents displacement of the connecting elements in the longitudinal direction.

The connecting elements 19 of the frame 18 in the form of profile planks are connected with the connecting elements 13 of the panel: in the corners—with corner frames, on the sides—with linear frames in a required quantity, by placing the connecting elements 19 of the frame over the counterpart of the connecting elements 13 of the panel and pressing the top sections to the lower ones. At the same time, due to the high accuracy of manufacturing the connecting elements of both the panel and the frame, some elements go into the corresponding reciprocal elements and are held in them. By doing so, a fast, reliable connection of the frame with the panel is ensured. The protruding element of the frame prevents the connecting elements from moving in the longitudinal direction.

The movable reflective element is obtained by punching from sheet materials, including those having various colors, according to a design project.

The panel is assembled in the following way.

1. The panels are connected, with the help of the connecting elements, into one whole panel picture which is, if necessary, enclosed in a frame.
2. The movable reflective elements 3 are put on the holders 5 according to the design project.

To put on the movable reflective element, it is required to place the movable reflective element horizontally, i.e., turn the movable reflective element along the 02-02 axis by 90 degrees, put it through the hole 11 on the fixing head 6 and return it by turning it 90 degrees to its original position.

3. The lightweight cast frame support is installed according to the design project by hanging either rigid or hinged fastening to supporting structures.

The movable reflective elements 3 hang freely on the holders 5, and the heads 6 keep them from falling. On the other side, their horizontal displacement is limited by the shoulders 7 of the holder body. The presence of the cavity 8 in the body 4 of the cantilever element reduces the weight of the cantilever element, and in general, the entire panel. Since the upper part of the fixing head 6 is implemented such that it has a single flat surface 9 with the holder and tapers towards the free end in the form of a truncated cone, it is possible to quickly put on the movable reflective element when assembling the panel picture, replace the reflective elements in case of their damage or when creating complex mosaic images, which speeds up the process of assembling the decorative panel.

By making the connecting elements 13 stepwise—with the first protrusion 14 and the second protrusion 15 on one side, and with the protruding element 16 extending from the first protrusion 14 on another side such that the groove 17 is formed under the protruding element 16,—it is possible to quickly and easily connect the panels into the panel picture with one click. The reliability of the connection is ensured by the high degree of manufacturing accuracy, which allows one to rigidly connect the panels to each other without significant effort; in this case, the protruding element 16 prevents the displacement of the connecting elements in the longitudinal direction.

If it is necessary to disconnect the modules, the connecting elements of one panel are pushed out with a slight effort from the reciprocal elements of another panel.

The preferred embodiment of the invention has been described above. However, it should be obvious to those skilled in the art that this embodiment is not limiting, and other embodiments of the invention are possible without changing its essence.

INDUSTRIAL APPLICABILITY

The present reflective decorative panel is essentially a construction set (a construction set is a set of standard parts from which many different models can be assembled. Finished parts eliminate the time required to manufacture specific parts to order, and do not require special training to create complex systems. Wikipedia). Ready-made panels made according to the invention make it possible to speed up the assembly of a panel picture, and do not require special training to create complex composite decorative panel pictures.

The proposed technical solution allows for quick, easy and reliable connection of panels in a panel picture.

The reflective decorative panel can be used for outdoor holiday decorations, voluminous objects and structures for games, entertainments and public events, signboards, display stands, advertising media and other decorative products.

The invention claimed is:

1. A reflective decorative panel comprising:

a monolithic base that is a module of the panel;

cantilever elements made integral with the base;

movable reflective elements having holes by which the movable reflective elements are arranged on the cantilever elements; and connecting elements for connecting the panel with at least one other reflective decorative panel, the connecting elements being provided on edge sections of the base;

wherein each of the connecting elements having a first protrusion and a second protrusion on one side and a protruding element extending from the first protrusion on another side such that there is a groove under the protruding element; and wherein the connecting elements are configured to rigidly connect the panel with the at least one other reflective decorative panel by mating the protrusions and grooves of the panel with the reciprocal grooves and protrusions of the at least one other reflective decorative panel.

2. The panel of claim 1, wherein each of the cantilever elements comprises:

a body;

a holder; and a fixing head;

wherein the body has shoulders configured to limit a movement of the movable reflective element horizontally;

wherein the body has a cavity accommodating the holder that is configured as a semi-cylinder and is connected by a flat side to the body;

wherein the holder passes into the fixing head with a single flat surface of the holder and an upper part of the head, and a lower part of the fixing head has a larger diameter than the holder and forms a protruding section above the holder;

wherein the fixing head tapers towards a free end in the form of a truncated cone.

3. A decorative panel assembly comprising:

multiple reflective decorative panels according to claim 1, the multiple reflective panels being rigidly interconnected by the connecting elements; and a frame configured as profile planks which are provided with connecting elements, the connecting elements of the frame being configured as counterparts of the connecting elements of the multiple reflective decorative panels;

wherein the multiple reflective decorative panels are enclosed in the frame by mating the connecting elements of the frame with the connecting elements of peripheral reflective decorative panels from the multiple reflective decorative panels.

* * * * *